United States Patent

Song

(10) Patent No.: US 6,456,332 B1
(45) Date of Patent: Sep. 24, 2002

(54) DEVICE FOR GENERATING SYNC SIGNALS OF COMPOSITE VIDEO SIGNAL

(75) Inventor: Moon-Jong Song, Kyungki-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/114,158

(22) Filed: Jul. 13, 1998

(30) Foreign Application Priority Data

Jul. 12, 1997 (KR) ............................................. 97-32392

(51) Int. Cl.[7] .................................................. H04N 5/10
(52) U.S. Cl. ........................................ 348/530; 348/525
(58) Field of Search ................................. 348/525, 528, 348/529, 530, 531, 536, 540–548, 510; 331/20; H04N 5/04, 5/10

(56) References Cited

U.S. PATENT DOCUMENTS

| | | | |
|---|---|---|---|
| 4,001,715 A | * 1/1977 | Fukaya | 331/20 |
| 4,612,574 A | * 9/1986 | Barnes | 331/20 |
| 4,709,267 A | * 11/1987 | Sendelweck | 348/500 |
| 4,894,719 A | * 1/1990 | Moon | 348/530 |
| 5,019,907 A | * 5/1991 | Murakoshi et al. | 331/20 |
| 5,576,770 A | * 11/1996 | Rumreich | 348/525 |

* cited by examiner

Primary Examiner—Michael H. Lee
(74) Attorney, Agent, or Firm—Stass & Halsey LLP

(57) ABSTRACT

A device which generates horizontal and vertical sync signals of a composite signal to create a soft picture on a display monitor by preventing a free running effect of a composite signal which is caused by a mode conversion between recorded and unrecorded areas of the picture when a composite signal generated from an alternative source such as a VCR instead of an external input signal is applied to the display monitor. The device includes a microcomputer for generating a sync select signal based on a display mode, and a composite signal analyzing and horizontal/vertical oscillating circuit for generating horizontal and vertical oscillating signals based on a luminance signal separated from a composite signal input. A horizontal sync signal generator processes the horizontal oscillating signal, to generate a composite horizontal sync signal. A vertical sync signal generator processes the vertical oscillating signal, to generate a composite vertical sync signal. A sync signal switching circuit selectively outputs one pair among the composite horizontal and vertical sync signals respectively generated from the horizontal and vertical sync signal generator and horizontal and vertical sync signals transmitted from a host computer in response to the select signal generated by the microcomputer.

20 Claims, 4 Drawing Sheets

DEVICE FOR GENERATING SYNC SIGNALS OF COMPOSITE VIDEO SIGNAL

Cross-Reference to Related Application

This application makes reference to, incorporates the same herein, and claims all benefits accruing under 35 U.S.C. §119 from my application entitled An Apparatus for Generating Composite vertical Synchronous Signal filed with the Korean Industrial Property office on Jul. 12, 1997 and there duly assigned Serial No. 97-32392 by that Office.

BACKGROUND OF THE INVENTION

1. Field of the Invention

The present invention relates to display devices and, more particularly, to a device for generating sync signals for an externally applied composite video signal, which separates and processes and signals from the luminance signal contained in a composite signal input to a monitor.

2. Description of the Related Art

Recently developed multimedia-type computer systems provide a wide variety of display functions by including auxiliary equipment such as MPEG boards and television receiver cards. Along with this trend, a display monitor must also become capable of processing various signals by providing a function for processing a composite video signal which does not originate from the host computer.

A conventional display monitor having such a composite video function is shown in FIG. 1. FIG. 1 shows a host computer 100 including a CPU 110 for executing an application program and generating video data, and a video card 120 for processing the video data and outputting horizontal and vertical sync signals and an RGB signal.

Referring to FIG. 7, the display monitor includes a digital computer filter 210 for separating a composite signal externally applied thereto into a luminance signal (Y) and a chrominance signal (C); horizontal and vertical sync signal generators 221 and 222 for generating horizontal and vertical sync signals, respectively, based on the separated luminance signal output; a composite signal analyzing and horizontal/vertical oscillating circuit 250 for outputting an RGB video signal; a microcomputer 230 for determining display resolution based on sensed sync signal inputs from a sync signal switching circuit 223 in order to output a control signal to a synchronization circuit 240, and for generating select signals based on the application program; a video signal switching circuit 260 for selectively outputting the externally applied video signal or the video signal applied from the video card 120 according to the microcomputer's video select signal, for amplification and display via a video amplifier 270 and a CRT 280, and the sync signal switching circuit 223 for selectively outputting the sync signals generated based on the externally applied composite video signal or those applied from the video card 120 according to the microcomputer's sync select signal, for input to the microcomputer's frequency discrimination circuitry (not shown).

As shown in FIG. 2, which is a more detailed circuit diagram of the operative elements of the above conventional display monitor, the separated luminance signal is applied to the horizontal sync signal generator 221 and is used to generate both the horizontal and vertical sync signals. That is, the luminance signal output from the digital computer filter 210 is applied to the base of a transistor Q1 via resistors R1 and R13 and a capacitor C1. The translator Q1 is turned on in response to the luminance signal, generating a composite horizontal sync signal across a load resistor R2. For a standard VGA monitor, this frequency is 15.75 kHz. The composite horizontal sync signal fed to the vertical sync signal generator 222 is integrated through resistors R3 and R4 and capacitors C4 and C5, so as to apply the vertical sync frequency (e.g., 60 Hz) to the case of a transistor Q2. A transistor Q3 is part of a Darlington pair formed with the transistor Q2 and configured with a resistor R5, to thereby generate the composite vertical sync signal across an output resistor R14.

Thus, the composite horizontal and vertical sync signals are applied to the sync signal switching circuit 223, together with the corresponding sync signals from the host computer 100, for selective application to the microcomputer 230. Meanwhile, the composite signal analyzing and horizontal/vertical oscillating circuit 250 regenerates the composite RGB video signal for output to the video signal switching circuit 250, together with the corresponding RGB video signal from the host computer 100, for selective application to the video amplifier 270 and ultimate display via the CRT 280 under the control of the synchronization circuit 240.

In the operation of the conventional display monitor having the above construction, a composite signal source such as a VCR or television tuner (not shown) is applied to the digital computer filter 210. The separated luminance signal output is used to create both sync signals via the horizontal and vertical sync signal generators 221 and 222.

Therefore, in the conventional display monitor as described above, the composite signal generated from a VCR or television may undergo mode conversions which temporarily render the composite video input without a luminance signal, such as between the recorded and unrecorded portions of a video tape or during the tuning of the television receiver. At this time, the conventional use of an externally applied composite sync signal causes a "free-running" display phenomenon, which generates an undesirable display including video noise, since no sync signal (either horizontal or vertical) input can be present for transmission to the display monitor via the microcomputer.

SUMMARY OF THE INVENTION

Accordingly, in order to overcome such drawbacks in the conventional art, it is therefore an object of the present invention to provide a device for generating the sync signals of a composite video signal, in which a horizontal or vertical sync signals input to the microcomputer are constantly maintained regardless of the state of a composite video signal source.

It is another object of the present invention to provide a device for generating the sync signals of a composite video signal, in which a free-running display phenomenon can be avoided.

It is yet another object of the present invention to provide a device fox generating the sync signals of a composite video signal, in which video display noise is reduced.

To achieve these and other objects and advantages and in accordance with the purpose of the present invention, as embodied and broadly described, there is provided a device for generating sync signals of a composite signal, including a microcomputer for generating a sync select signal based on display mode; a composite signal analyzing and horizontal/vertical oscillating circuit for generating horizontal and vertical oscillating signals based on a luminance signal separated from a composite signal input; a horizontal sync signal generator for processing the horizontal oscillating signal generated from the composite signal analyzing and horizontal,/vertical oscillating circuit so as to generate a composite horizontal sync signal; a vertical sync signal generator for processing the vertical oscillating signal generated from the composite signal analyzing and horizontal/vertical oscillating circuit so as to generate a composite vertical sync signal; and a sync signal switching circuit for selectively outputting one pair among the composite horizontal and vertical sync signals respectively generated from the horizontal and vertical sync signal generators and horizontal and vertical sync signals transmitted from a host computer, in response to the select signal generated by the microcomputer.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF PREFERRED EMBODIMENT

Figure 1:
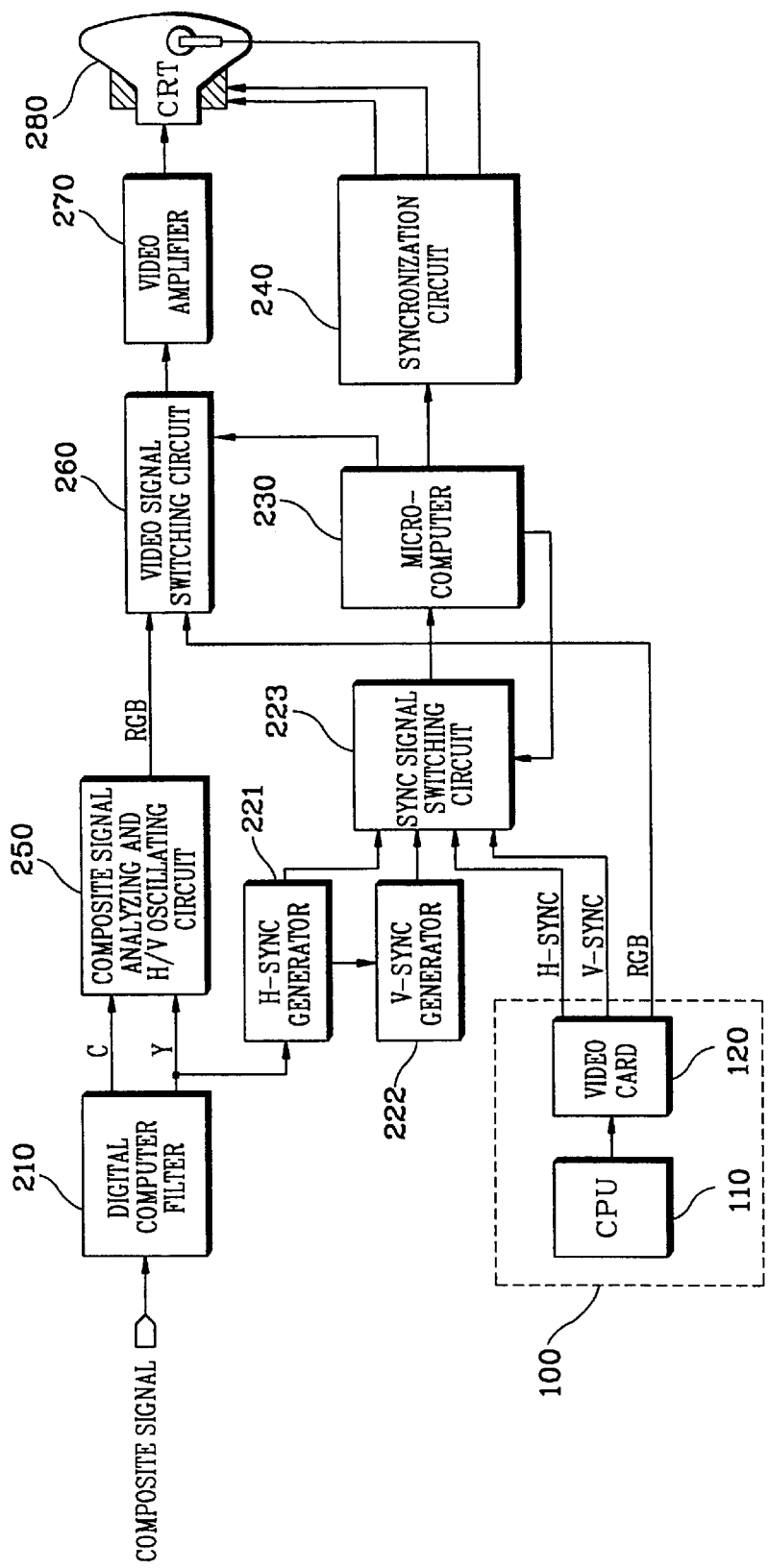
FIG. 1 is a block diagram of a conventional display monitor.
Figure 2:
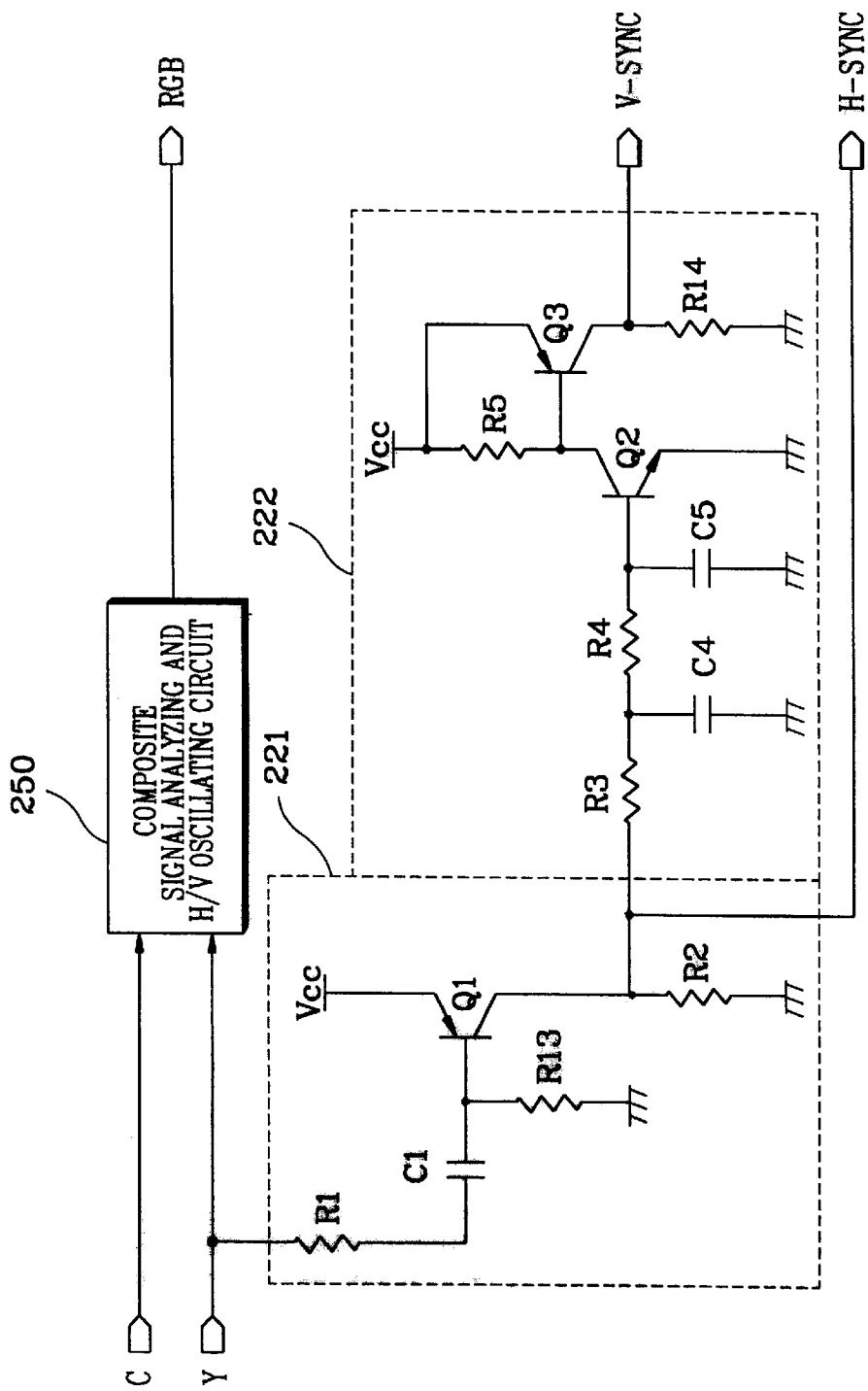
FIG. 2 is a detailed circuit diagram of a portion of the display monitor shown in FIG. 1.

A composite sync signal generator according to the embodiment of the present invention employs a conventional composite signal analyzing and horizontal/vertical oscillating circuit (reference numeral 250 of FIGS. 1 and 2) which typically includes horizontal and vertical oscillators. Though these oscillators are not activated in the composite sync signal generator shown in FIG. 2, the composite analyzing and horizontal/vertical oscillating circuit 250a according to the embodiment of the present invention generates both horizontal and vertical oscillating signals in addition to the composite RGB video signal.

Figure 3:
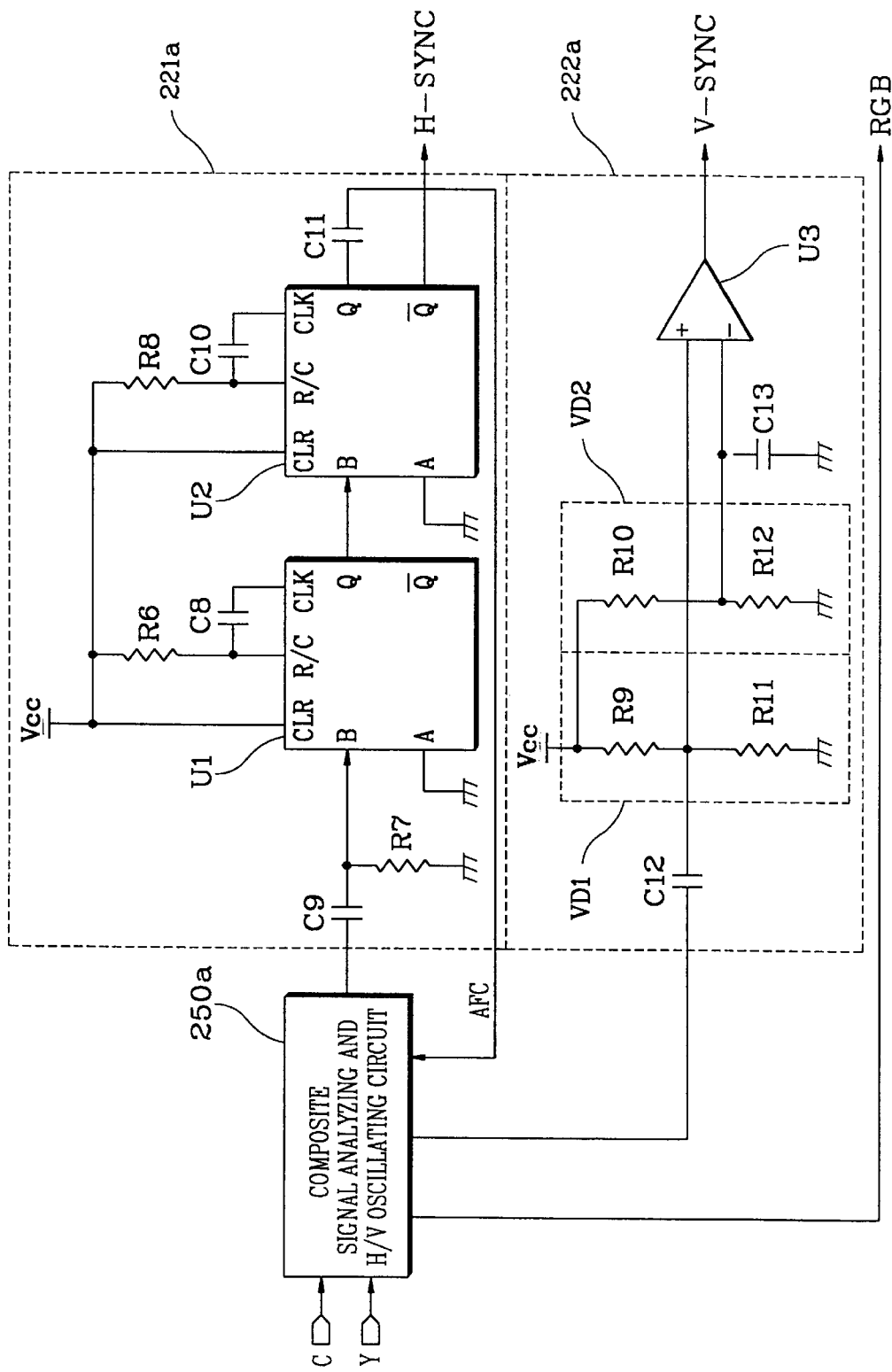
FIG. 3 is a detailed circuit diagram of a device for generating the sync signals of a composite video signal, according to an embodiment of the present invention.

Referring to FIG. 3, a horizontal sync signal generator 221a comprises a first multivibrator U1 for regulating the pulse width of the horizontal oscillating signal applied from the composite analyzing and horizontal/vertical oscillating circuit 250a, and a second multivibrator U2 for regulating the pulse width of the output signal generated from the first multivibrator U1, to thereby generate a composite horizontal sync signal output. A vertical sync signal generator 222a receives the vertical oscillating signal generated from the composite signal analyzing and horizontal/vertical oscillating circuit 250a and comprises a first voltage divider VD1 for dividing a bias voltage (Vcc, which is 5 V in the embodiment) to maintain a constant biasing of the vertical oscillating signal, a second voltage divider VD2 for dividing the bias voltage to maintain a constant reference voltage and a comparator U3 for comparing the outputs from the first and second voltage dividers, to thereby generate a composite vertical sync signal output.

In the horizontal sync signal generator 221a, the horizontal oscillating signal is fed to a B input port of the first multivibrator U1 via a capacitor C9 and a resistor R7, where pulse width regulation is performed through a charge/discharge operation according to the time constant of a resistor R5 and a capacitor C8. The pulse-width-regulated horizontal oscillating signal, output from the Q output of the first multivibrator U1, is applied to a B input port of the second multivibrator U2, where pulse width regulation is performed through a charge/discharge operation according to the time constant of a resistor R8 and a capacitor C10. The composite horizontal sync signal output is generated from the inverted Q output of the second multivibrator U2, while the Q output thereof is fed back through a capacitor C11 to the composite signal analyzing and horizontal/vertical oscillating circuit 250a as an AFC control signal. The thus-generated composite horizontal sync signal is applied to the sync signal switching circuit 223.

Figure 4:
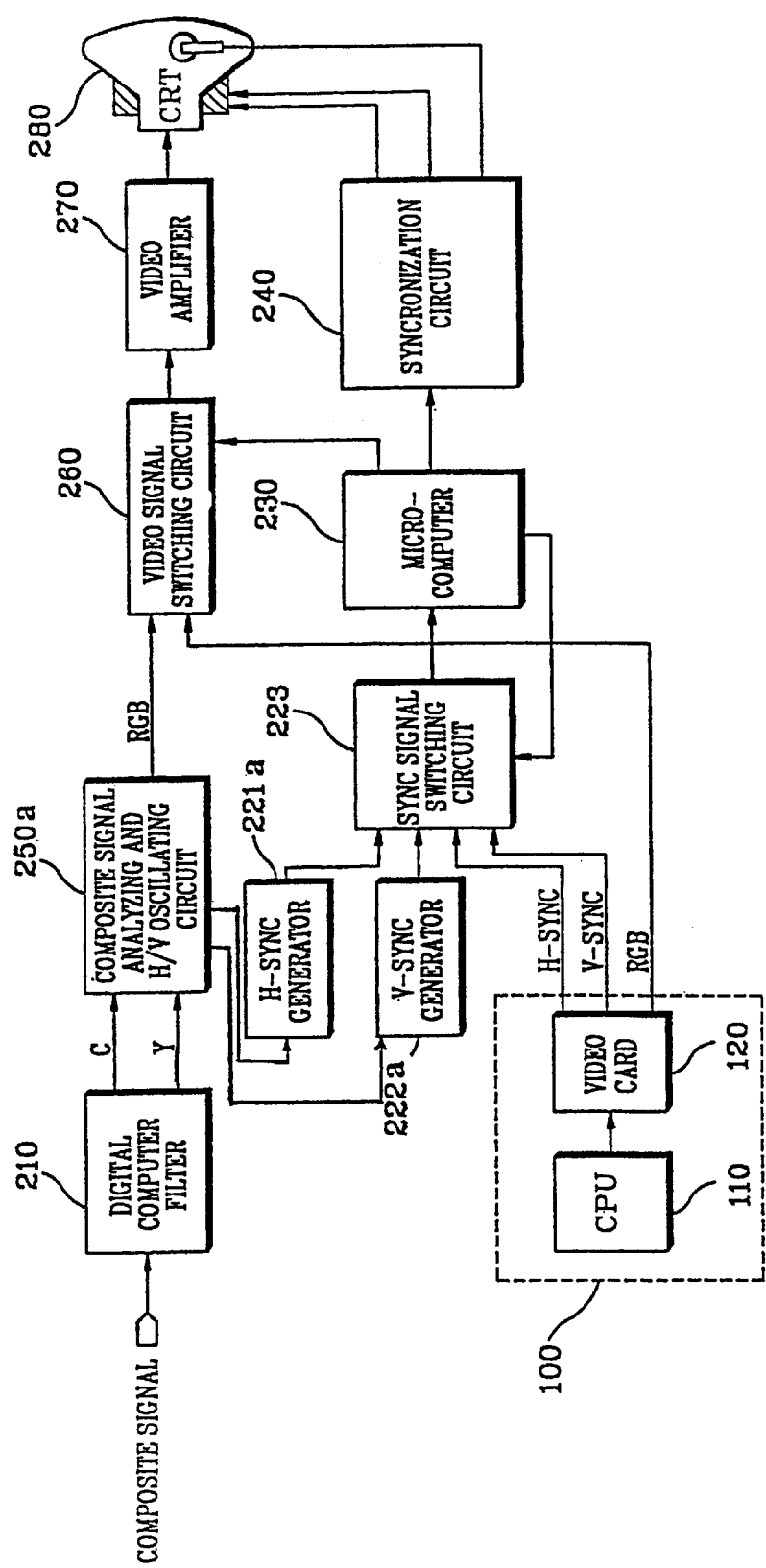
FIG. 4 is a block diagram of a display monitor incorporating the detailed circuit diagram shown in FIG. 3.

Meanwhile, the vertical oscillating signal generated from the composite signal analyzing and horizontal/vertical oscillating circuit 250a is applied to the first voltage divider VD1 via a capacitor C12, which divides the bias voltage using resistors R9 and R11, thus biasing the vertical oscillating signal to a predetermined level. Also, the second voltage divider VD2 divides the bias voltage through resistances R10 and R12 to a constant reference voltage, which is noise-filtered via a capacitor C13. The biased vertical oscillating signal and the constant reference voltage are applied to the non-inverting and inverting inputs of the comparator U3, respectively. The comparator U3 compares the levels of the two signals, in order to generate a composite vertical sync signal for input to the sync signal switching circuit 223. Referring to FIG. 4, this figure illustrates a block diagram of a display monitor incorporating the composite signal analyzing and horizontal/vertical oscillating circuit 250a, the horizontal sync signal generator 221a, and the vertical sync signal generator 222a, in accordance with the present invention.

As described above, the horizontal and vertical oscillating signals are derived from the composite signal through the analyzing and horizontal/vertical oscillating circuit, to generate horizontal and vertical sync signals for selective input to the microcomputer such that the free running effect can be prevented.

It will be apparent to those skilled in the art that various modifications can be made in the composite sync signal generator of the present invention, without departing from the spirit of the invention. Thus, it is intended that the present invention cover such modifications as well as variations thereof, within the scope of the appended claims and their equivalents.

What is claimed is:

1. A device for generating composite horizontal and vertical sync signals of a composite signal, comprising:

a microcomputer to generate a sync select signal based on a display mode;

a composite signal analyzing and horizontal/vertical oscillating circuit to generate horizontal and vertical oscillating signals based on a luminance signal separated from the composite signal ;

a horizontal sync signal generator to process the horizontal oscillating signal generated from said composite signal analyzing and horizontal/vertical oscillating circuit, to generate a composite horizontal sync signal;

a vertical sync signal generator to process the vertical oscillating signal generated from said composite signal analyzing and horizontal/vertical oscillating circuit, to generate a composite vertical sync signal, and a sync signal switching circuit to selectively output one pair among the composite horizontal and vertical sync signals respectively generated from said horizontal and vertical sync signal generators and horizontal and vertical sync signals transmitted from a host computer in response to the select signal generated by said microcomputer.

2. The device as claimed in claim 1, wherein said horizontal sync signal generator comprises:
a first multivibrator to regulate a pulse width of the horizontal oscillating signal from said composite signal analyzing and horizontal/vertical oscillating circuit, to generate an output signal; and
a second multivibrator to regulate a pulse width of the output signal generated from said first multivibrator, to generate the composite horizontal sync signal.

3. The device as claimed in claim 1, wherein said vertical sync signal generator comprises:
a first voltage divider, to receive the vertical oscillating signal generated from said composite signal analyzing and horizontal/vertical oscillating circuit, and to divide a bias voltage to maintain a constant biasing of the vertical oscillating signal, to output a DC-biased vertical oscillating signal;
a second voltage divider to divide the bias voltage to output a reference voltage; and
a comparator to compare the DC-biased vertical oscillating signal and the reference voltage applied from said first and second voltage dividers, respectively, to generate the composite vertical sync signal.

4. The device as claimed in claim 2, further comprising:
a first RC circuit having a first time constant and connected to said first multivibrator, wherein said first multivibrator regulates the pulse width of the horizontal oscillating signal according to the first time constant; and
a second RC circuit having a second time constant and connected to said second multivibrator, wherein said second multivibrator regulates the pulse width of the output signal according to the second time constant.

5. The device as claimed in claim 1, wherein said horizontal sync signal generator generates an AFC control signal from a first port inverted in relation to a second port from which the composite horizontal sync signal is output, and transmits the AFC control signal to said composite signal analyzing and H/V oscillating circuit.

6. The device as claimed in claim 2, wherein said horizontal sync signal generator generates an AFC control signal from a first port inverted in relation to a second port from which the composite horizontal sync signal is output, and transmits the AFC control signal to said composite signal analyzing and HIV oscillating circuit.

7. The device as claimed in claim 3, further comprising a capacitor connected between said second voltage divider and said comparator, to noise filter the constant reference voltage prior to input to said comparator.

8. The device as claimed in claim 2, wherein said vertical sync signal generator comprises:
a first voltage divider, to receive the vertical oscillating signal generated from said composite signal analyzing and horizontal/vertical oscillating circuit, to divide a bias voltage to maintain a constant biasing of the vertical oscillating signal, to output a DC-biased vertical oscillating signal;
a second voltage divider to divide the bias voltage, to output a reference voltage; and
a comparator to compare the DC-biased vertical oscillating signal and the reference voltage applied from said first and second voltage dividers, respectively, to generate the composite vertical sync signal.

9. The device as claimed in claim 8, further comprising a capacitor connected between said second voltage divider and said comparator, to noise filter the constant reference voltage prior to input to said comparator.

10. A device to generate composite horizontal and vertical sync signals from a composite video signal, comprising:
a separator to separate a luminance signal from the composite video signal;
a composite signal analyzing and H/V oscillating circuit to generate horizontal and vertical oscillating signals based upon the luminance signal;
a horizontal sync signal generator to generate the composite horizontal sync signal based upon the horizontal oscillating signal; and
a vertical sync signal generator to generate the composite vertical sync signal based upon the vertical oscillating signal.

11. The device as claimed in claim 10, which receives horizontal and sync signals from a host computer, further comprising:
a processing device to generate a sync select signal based on a display mode; and
a sync signal switching circuit to selectively output one pair among the composite horizontal and vertical sync signals from the horizontal and vertical sync signal generators, and the horizontal and vertical sync signals received from the host computer, in response to the sync select signal.

12. The device as claimed in claim 10, wherein said horizontal sync signal generator generates an AFC signal, which is an inverted waveform of the horizontal sync signal, and transmits the AFC control signal to said composite signal analyzing and H/V oscillating circuit.

13. The device as claimed in claim 10, wherein said horizontal sync signal generator comprises a pulse width regulator to regulate a pulse width of the horizontal oscillating signal, to generate the composite horizontal sync signal.

14. The device as claimed in claim 13, wherein said pulse width regulator comprises:
a first regulator to regulate the pulse width of the horizontal oscillating circuit according to a first RC time constant, to generate an output signal; and
a second regulator to regulate a pulse width of the output signal according to a second RC time constant, to generate the composite horizontal sync signal.

15. The device as claimed in claim 10, wherein said vertical sync signal generator comprises:
a biasing circuit to constantly bias the vertical oscillating signal; a reference voltage generator to generate a reference voltage; and
a comparator to compare the constantly biased vertical oscillating signal with the reference voltage, to generate the composite vertical sync signal.

16. A device to generate composite horizontal and vertical sync signals from a composite video signal, comprising:
a separator to separate a luminance signal from the composite video signal; and
a sync signal generator to generate the composite horizontal and vertical sync signals based upon the luminance signal, and to constantly generate the composite horizontal and vertical sync signals regardless of the composite video signal received by said separator.

17. The device as claimed in claim 16, wherein said sync signal generator comprises:

a composite signal analyzing and HIV oscillating circuit to generate horizontal and vertical oscillating signals based upon the luminance signal;

a horizontal sync signal generator to generate the composite horizontal sync signal based upon the horizontal oscillating signal; and a vertical sync signal generator to generate the composite vertical sync signal based upon the vertical oscillating signal.

18. The device as claimed in claim 17, wherein said vertical sync signal generator constantly biases the vertical oscillating signal and compares the constantly biased vertical oscillating signal with a predetermined voltage, to generate the composite vertical sync signal.

19. A device to generate composite horizontal and vertical sync signals from a composite video signal, comprising:

a separator to separate a luminance signal from the composite video signal; and a sync signal generator to generate the composite horizontal and vertical sync signals based upon independent signals derived from the luminance signal, wherein the generation of the composite vertical sync signal is independent of the generation of the composite horizontal sync signal.

20. The device as claimed in claim 19, wherein said sync signal generator comprises:

a composite signal analyzing and HIV oscillating circuit to generate horizontal and vertical oscillating signals based upon the luminance signal;

a horizontal sync signal generator to generate the composite horizontal sync signal based upon the horizontal oscillating signal; and a vertical sync signal generator to generate the composite vertical sync signal based upon the vertical oscillating signal.

* * * * *

UNITED STATES PATENT AND TRADEMARK OFFICE
CERTIFICATE OF CORRECTION

PATENT NO.    : 6,456,332 B2
DATED         : September 24, 2002
INVENTOR(S)   : Moon-jong Song It is certified that error appears in the above-identified patent and that said Letters Patent is hereby corrected as shown below:

Column 5,
Line 53, change "HIV" to -- H/V --

Column 6,
Line 56, "a reference" begins a new paragraph.

Column 7,
Line 11, change "HIV" to -- H/V --.

Signed and Sealed this

Fourth Day of February, 2003

JAMES E. ROGAN
*Director of the United States Patent and Trademark Office*